Aug. 12, 1958  T. H. SCHONWISE  2,846,721
ARTICLE RELEASING APPARATUS
Filed Sept. 20, 1954  4 Sheets-Sheet 3
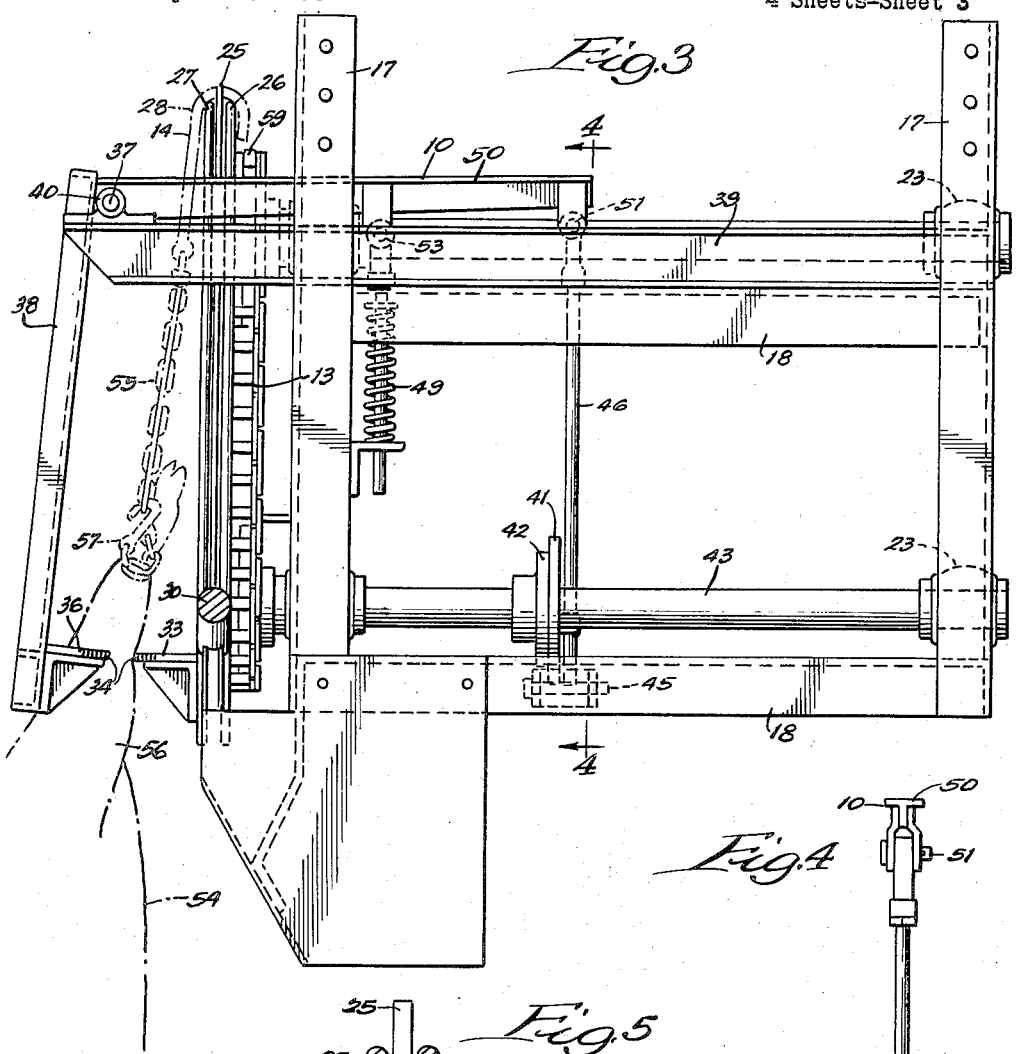
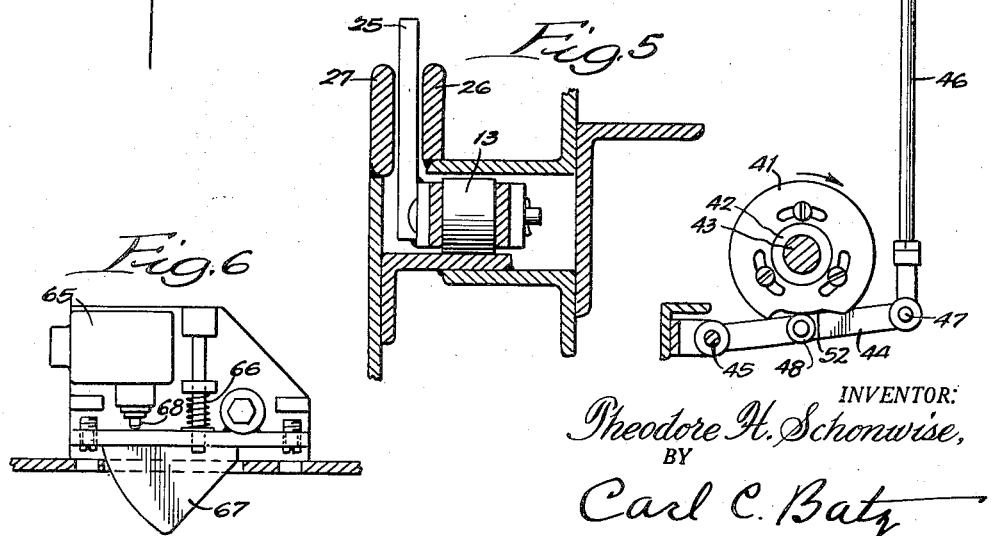
INVENTOR:
Theodore H. Schonwise,
BY
Carl C. Batz
ATTORNEY.

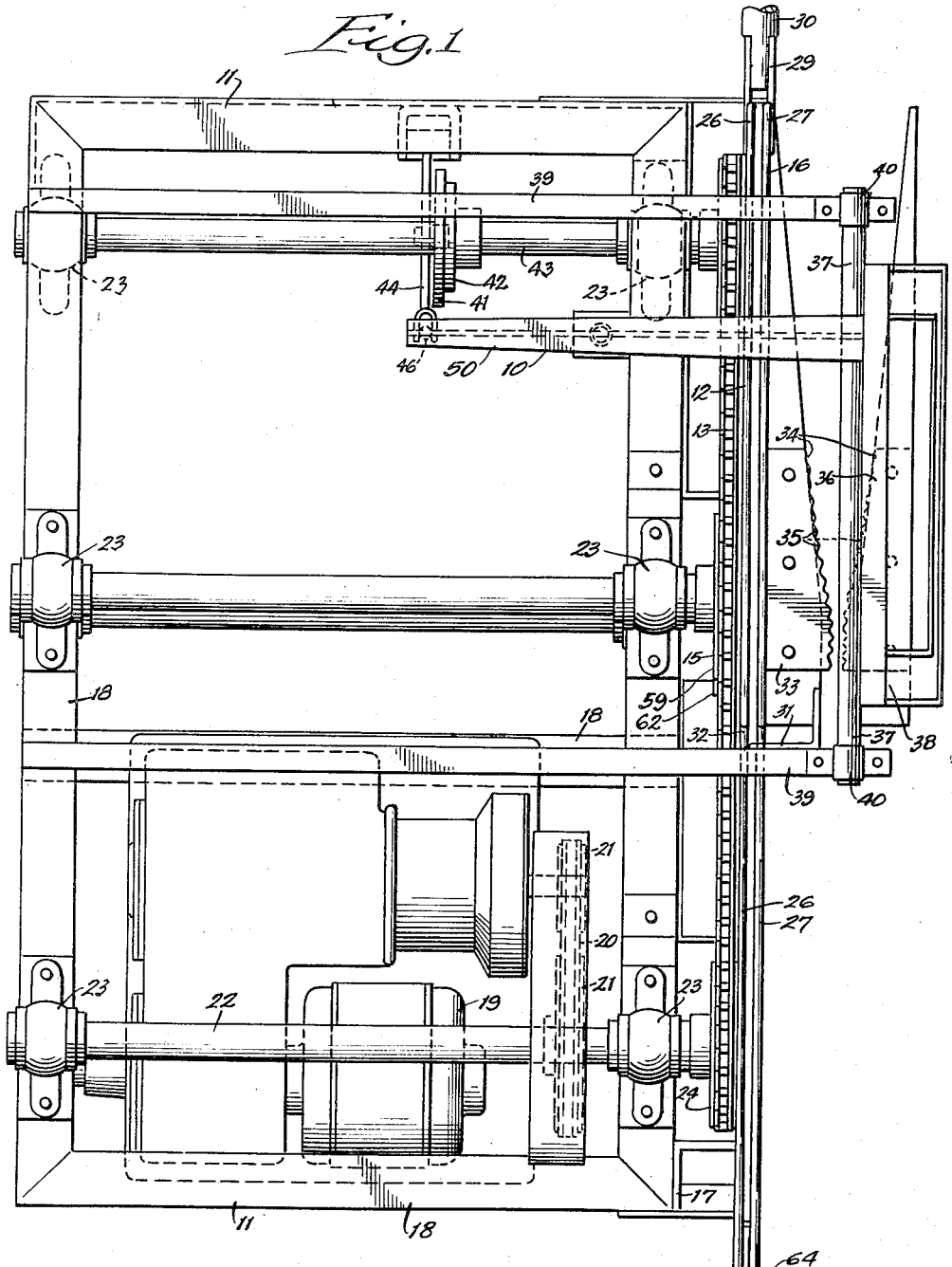

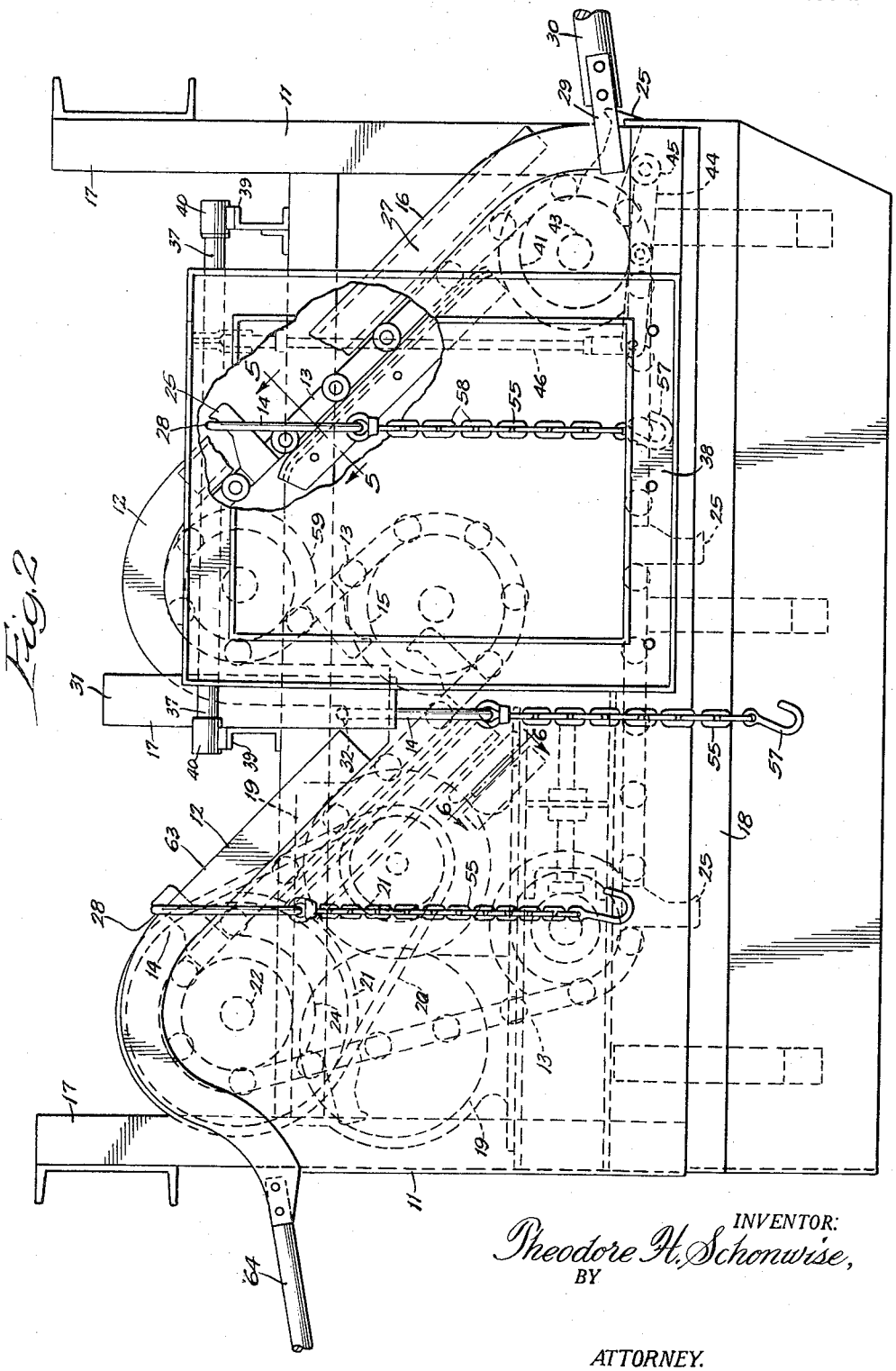

Aug. 12, 1958 T. H. SCHONWISE 2,846,721
ARTICLE RELEASING APPARATUS
Filed Sept. 20, 1954 4 Sheets-Sheet 4

INVENTOR:
Theodore H. Schonwise,
BY
Carl C. Batz
ATTORNEY.

United States Patent Office 2,846,721
Patented Aug. 12, 1958

2,846,721

ARTICLE RELEASING APPARATUS

Theodore H. Schonwise, Peoria, Ill., assignor to Armour and Company, Chicago, Ill., a corporation of Illinois Application September 20, 1954, Serial No. 457,188

5 Claims. (Cl. 17—24)

This invention relates to conveyor systems, and more particularly, to apparatus for releasing articles from movable supports conveyed on overhead rail systems.

It is an object of this invention to provide apparatus for disengaging movable article supports from overhead rails. It is a further object of this invention to provide apparatus for releasing articles from movable supports conveyed on rails. A further object of this invention is to provide apparatus for transporting articles during a manufacturing operation on overhead rails, and thence releasing such articles from the rails. Still another object of this invention is to provide apparatus wherein unwieldy articles are conveyed by means of movable supports on overhead rails, and thence released from such rails and disengaged from such supports. Other objects and advantages will appear in the following detailed description of the invention.

One embodiment of the present invention provides a machine adapted to such mass production methods as are practiced in large packing-house establishments. In a typical abattoir procedure, for example, in the slaughtering of hogs, after the animals have been dispatched the carcasses are supended head downward from an overhead conveyor system in a bleeding operation. After bleeding has been completed the hogs are delivered by this conveyor to the dehairing operation, which usually includes a scalding step.

In this conveyor system, the carcasses are releasably suspended from overhead rails by a movable support which usually takes the form of a shackle chain attached to a rear extremity of the carcass. When delivering the individual carcass from the bleeding operation to the scalding step, it has heretofore been necessary to manually unhook the shackle chain from the hind leg and release the carcass into a scalding tank. Mechanical means have been proposed in the past to relieve some of the manual labor involved in this unshackling operation, but none of these machines has been found to be entirely satisfactory in commercial operation. The present invention contemplates improvement over all of these mechanical releasing devices.

Figure 7:
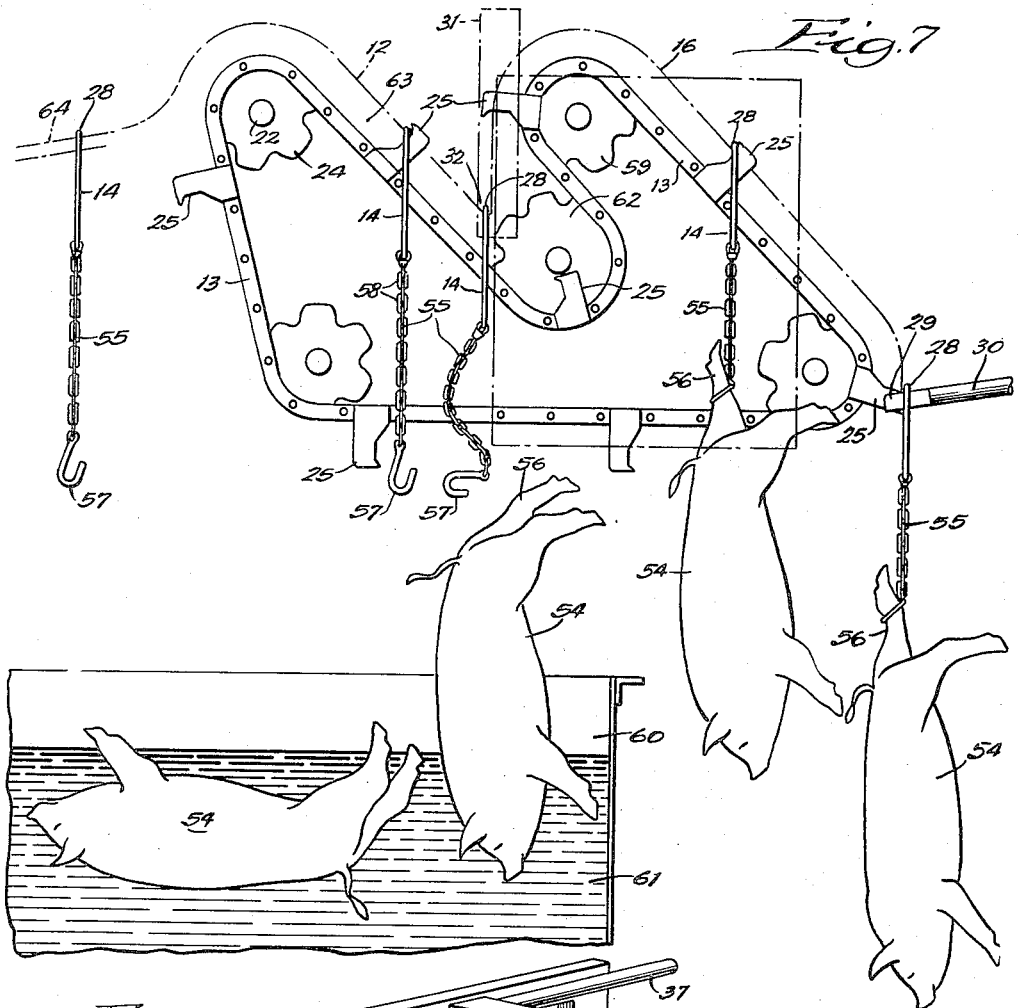
Figure 8:
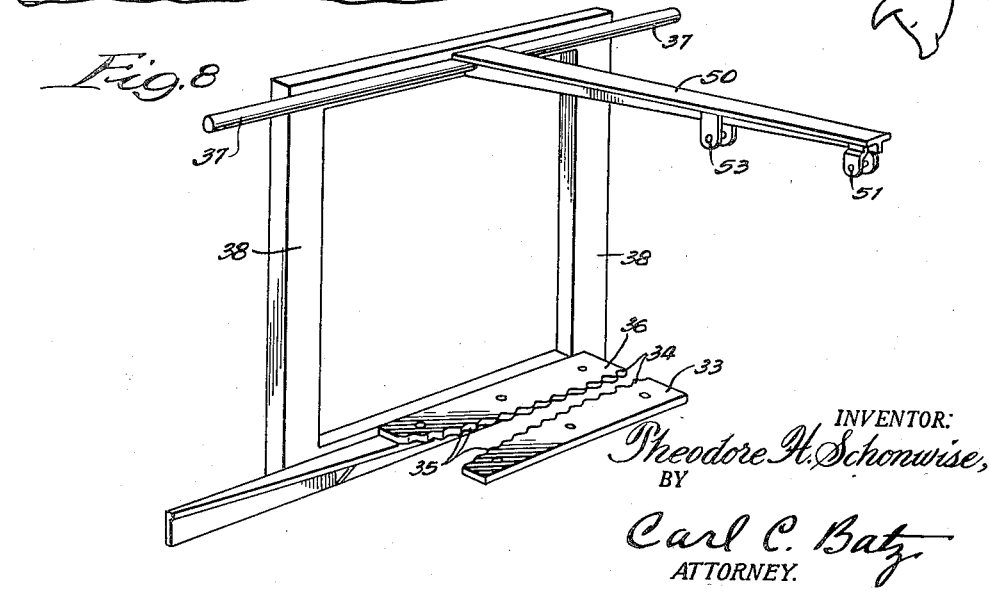

This particular embodiment of the present invention is illustrated in the accompanying drawings in which: Fig. 1 is a top plan view of the apparatus; Fig. 2 is a side view of the apparatus partly in cross section to show the constructive details of the apparatus; Fig. 3 is a detailed sectional view showing the article clamping structure; Fig. 4 is a detailed sectional view taken on line 4—4 of Fig. 3; Fig. 5 is a cross-sectional view taken on line 5—5 of Fig. 2; Fig. 6 is a detailed plan view of the safety switch taken on line 6—6 of Fig. 2; Fig. 7 is a perspective side view showing the essential elements of the apparatus in operative positions; and Fig. 8 is a detailed plan view of the clamping structure shown in Fig. 4.

This apparatus includes, principally a frame 11, an inclined portion 16 of guide rails 12, a motorized endless track 13, movable carcass supports 14, and clamping mechanism 10. The hog carcasses are releasably suspended from bleeding rail 30 on movable supports 14, and are conveyed on inclined guide rails 16 by motorized track 13 by projecting fingers 25 which engage the movable supports. When these supports pass the apex of the angularly elevated section of the conveyor rail 16, they are gravitationally released from the guide rails, whereupon the hind leg of the carcass is disengaged from the support and the carcass is delivered into the scalding tank.

The frame 11 may be of any suitable structure but in the illustrated embodiment has several vertical members 17 and horizontal members 18 so situated as to provide support for the various components of the apparatus. This structure provides a base for the driving mechanism which includes motor drive 20 powered by motor 19.

This driving mechanism rotates axle 22 set in roller bearings 23 by means of chain drive 20 running on sprockets 21. This axle is fitted into sprocket wheel 24, the teeth 24 of which wheel move an endless chain track 13 having upwardly projecting fingers 25 which move between the inner guide rail 26 and the outer guide rail 27. These fingers contact the hook portion 28 of carcass support 14 as the support travels to split rail 29 from bleeding rail 30. The hook is conveyed on the inclined portion 16 of guide rails 12 to the terminal 17 of the guide rails. The hook falls in aligning chute 31 to point 32 on the guide rail 12.

The clamping mechanism, as shown in Figs. 3 and 8, has a fixed abutment 33 with an angular edge 34 consisting of a series of indentations 35 and a corresponding clamping member 36. This clamping member is mounted on horizontal arm 37 by means of supporting members 38. The horizontal arm 37 is pivotally connected to lateral supports 39 (Fig. 1) by means of journal bearings 40. Referring now to Figs. 1 and 4 it is seen that the clamping mechanism is operated by cam wheel 41 mounted on hub 42 communicating with rotating axle 43 fitted into roller bearings 23. This cam communicates with roller 48 to operate rod 44 pivoted at 45 and pivotally connected to vertical arm 46 at 47. Spring 49 is biased against, and pivotally joined at 53 to, lateral arm 50 which is pivotally connected to vertical arm 46 at 51 and fixed to horizontal arm 37. The clamping member 36 is normally in the open position, and the cam indentation 52 is timed to operate in closing the clamping member 36 when the carcass support 14 is gravitationally released from guide rails 12. When roller 48 reaches the cam indentation 52, lateral arm 50 is moved upward by spring 49 and supporting members 38 are pivoted inward to position the clamping member 36 against the hind leg 56 of carcass 54.

In operation (see Fig. 7), an animal carcass 54, for example a slaughtered hog, is suspended from a carcass support 14 by looping chain 55 around hind leg 56 of the carcass. This leg is frictionally shackled by fitting hook 57 through a link 58 of chain 55 see Figs. 2 and 3. Hook 28 of carcass support 14 is looped over bleeding rail 30. When the carcass support reaches split rail 29, finger 25 is moved by endless track 13 between split rail 29 whereupon finger 25 engages hook 28, and the carcass support is conveyed on the inclined portion 16 of guide rails 12. As this movable support is conveyed on the inclined guide rails, the hind leg 56 of carcass 54 passes between clamping member 36 and abutment 33. When carcass support 14 is conveyed over sprocket wheel 59 and approaches the apex or drop section of the inclined guide rails, hind leg 56 becomes wedged in the jaws of clamping mechanism. The corresponding angular edges 34 provide wedging surfaces adapted to the differences in diameter of the hind legs of carcasses.

When movable support 14 is conveyed over sprocket wheel 59 to about terminal 17, the support is gravitationally released from guide rails 12. The cam mechanism is timed to cooperate with this release of the movable support in opening clamping member 36. The release of movable support 14 causes hook 57 to slip out of link 58 in chain 55, and when clamping member 36 is opened, movable support 14 is disengaged from hind leg 56. Thereupon, carcass 54 gravitates into scalding tank 60, which tank contains hot running water 61, and the hog is transported to the dehairing operation.

As carcass support 14 is released from guide rails 12 at terminal 17, hook 28 is guided downward in aligning chute 31 to about point 32 whereupon the hook is again engaged by guide rails 12 and engaged by the preceding finger 25 projecting from endless track 13, which finger has traveled around sprocket wheel 62. The hook is then conveyed on a second inclined portion 63 of guide rails 12 to collecting rail 64 and returned to service.

This apparatus is also provided with a safety switch (Fig. 6) having an electrical contact mechanism 65 spring biased 66 against a laterally extending plate 67. This switch is positioned so that if the hog is still engaged by the carcass support when such support is conveyed on the second inclined portion 63 of guide rails 12 the hind leg thereof 56 will engage lateral extending plate 67 and the weight of carcass 54 will force plate 67 against contact point 68, thereby closing switch mechanism 65 and shutting off motor 19 to suspend operation of the apparatus.

It will be understood that the apparatus of the present invention may be emloyed in the transport and release of any type article. Furthermore, it will be understood that this apparatus is especially useful when unwieldy or ponderous articles are suspended from an overhead rail system, and transported through various stages of a manufacturing operation.

The disengagement of the article from the movable support is accomplished through the gravitational force on the article and through the shock effected by the release of the movable support from the rail system. In one embodiment if this invention, as illustrated in the accompanying drawings, a clamping mechanism may be employed in conjunction with the article-releasing apparatus. This mechanism retards the fall of the article after release and aids in disengaging such article from the movable support. Thus, it will be apparent that any suitable clamping or article-retarding device may be incorporated into the structure of the apparatus of this invention.

One specific form of the apparatus has been illustrated in the accompanying drawings, and its operation described in connection with the transportation of hog carcasses during an abattoir operation. However, it will be understood that this apparatus is susceptible to considerable modification and adapted to transporting a variety of articles, and that other embodiments and forms of the apparatus are within the scope and spirit of this invention.

I claim:

1. In conveyor systems wherein animal carcasses are releasably shackled to carcass supports and wherein said supports are releasably mounted on overhead rails, means for releasing said supports from said rails comprising, an angularly elevated section of parallel rails having a drop section providing no vertical support for said article supports whereby said article supports passing over said drop section are subjected to a precipitous drop, an endless conveyor being in parallel relation with said rails and a portion of said conveyor being adjacent to said elevated section, fingers attached to said conveyor and projecting upwardly between said parallel rails, means for moving said conveyor and clamping means associated substantially with said drop section for engaging each of said carcasses below the level of the shackle, whereby said supports are engaged by said fingers and conveyed on said elevated section to said drop section whereat said supports are gravitationally released from said rails, said clamping means momentarily engaging each of said carcasses during the precipitous drop, and said carcasses are disengaged from said supports during said precipitous drop.

2. In apparatus for releasing an animal carcass from overhead rails wherein an appendage of said carcass is releasably shackled to a carcass support and wherein said support is releasably mounted on overhead rails, an angularly elevated section of rail having a drop section providing no vertical support for said article supports whereby said article supports passing over said drop section are subjected to a precipitous drop, means for conveying said support on said elevated section, and clamping means associated substantially with said drop section for engaging said appendage below the level of the shackle, whereby said support is gravitationally released from said rail at said drop section and said appendage is engaged by said clamping means to disengage said support from said carcass by retarding the fall of the carcass during said precipitous drop of said support and said carcass.

3. In conveyor systems, wherein an appendage of an animal carcass is releasably shackled to a carcass support, and wherein said support is suspended from an overhead rail, means for releasing said carcass from said rail comprising, an endless conveyor having an S-shaped portion, an angularly elevated section of said rail being in parallel relation with said conveyor and having an apex at one segment of said S-shaped portion, a second angularly elevated section rail being adjacent to another segment of said S-shaped portion, a series of fingers attached to said conveyor and projecting upwardly along the elevated rail sections, and clamping means associated substantially with said S-shaped portion for engaging said appendage below the level of the shackle, whereby said support is engaged by one of said fingers and conveyed on the first of said elevated sections to said apex, whereat said support is released from said rail and said clamping means engages said appendage during the drop over said S-shaped portion to disengage said support from said carcass, said support being then engaged by one of said fingers and conveyed on the second of said elevated sections for collection.

4. In a conveyor system wherein animal carcasses are releasably shackled to carcass supports and wherein such supports are movably mounted on overhead rails, apparatus for releasing said supports from said rails comprising an elevated section of parallel rails having a drop section providing no vertical support for said article supports whereby both said article supports and the carcasses supported thereby which pass over said drop section are subjected to a precipitous drop, an endless conveyor in parallel relationship with said rail, fingers attached to said conveyor and projecting upwardly between said parallel rails, clamping means associated substantially with the drop section of said elevated section of parallel rails, said clamping means being adapted to momentarily engage each of said carcasses below the level of the shackles supporting said carcasses, means for moving said conveyor whereby said supports are engaged by said fingers and conveyed along said elevated section to said drop section whereat said carcass support on passing the drop section is no longer supported by said rails and therefore freely falls downwardly together with the carcass supported thereby and thereby releases the tension on the shackles suspending the carcass which is momentarily engaged with said clamping means whereby said supports are disengaged from said carcasses.

5. In an article conveyor system, apparatus comprising an article support, an elevated section of rail having a drop section providing no vertical support for said article support whereby said article support passing over said drop section is subjected to a precipitous drop together with the article supported thereby, said article support being movably mounted on said rail, a chain attached to said article support, said chain having a hook at the end thereof whereby said chain may be looped about an article and said hook engaged with said chain and thereby support the article, means for momentarily retarding the fall of the articles supported by said article support, and means for moving said article support on said elevated rail to the drop section thereof whereat said article support falls freely thus relieving the tension on said chain whereby said hook is disengaged from said chain and the suspended article is released.

References Cited in the file of this patent

UNITED STATES PATENTS

| | | |
|---|---|---|
| 570,025 | Kennedy et al. | Oct. 27, 1896 |
| 996,799 | Schmidt | July 4, 1911 |
| 1,603,930 | Young | Oct. 19, 1926 |
| 2,052,749 | Brewster | Sept. 1, 1936 |
| 2,652,589 | Spooner | Sept. 22, 1953 |